July 2, 1957  P. V. WYSONG, JR., ET AL  2,797,764
HYDRAULIC STEERING ASSEMBLY WITH MOTOR FORMING
ONE LINK OF THE ASSEMBLY
Filed July 19, 1954  2 Sheets-Sheet 1

INVENTOR
Paul V. Wysong, Jr. &
Arthur F. Bohnhoff
BY C. F. Dible
ATTORNEY

July 2, 1957 P. V. WYSONG, JR., ET AL 2,797,764
HYDRAULIC STEERING ASSEMBLY WITH MOTOR FORMING
ONE LINK OF THE ASSEMBLY
Filed July 19, 1954 2 Sheets-Sheet 2
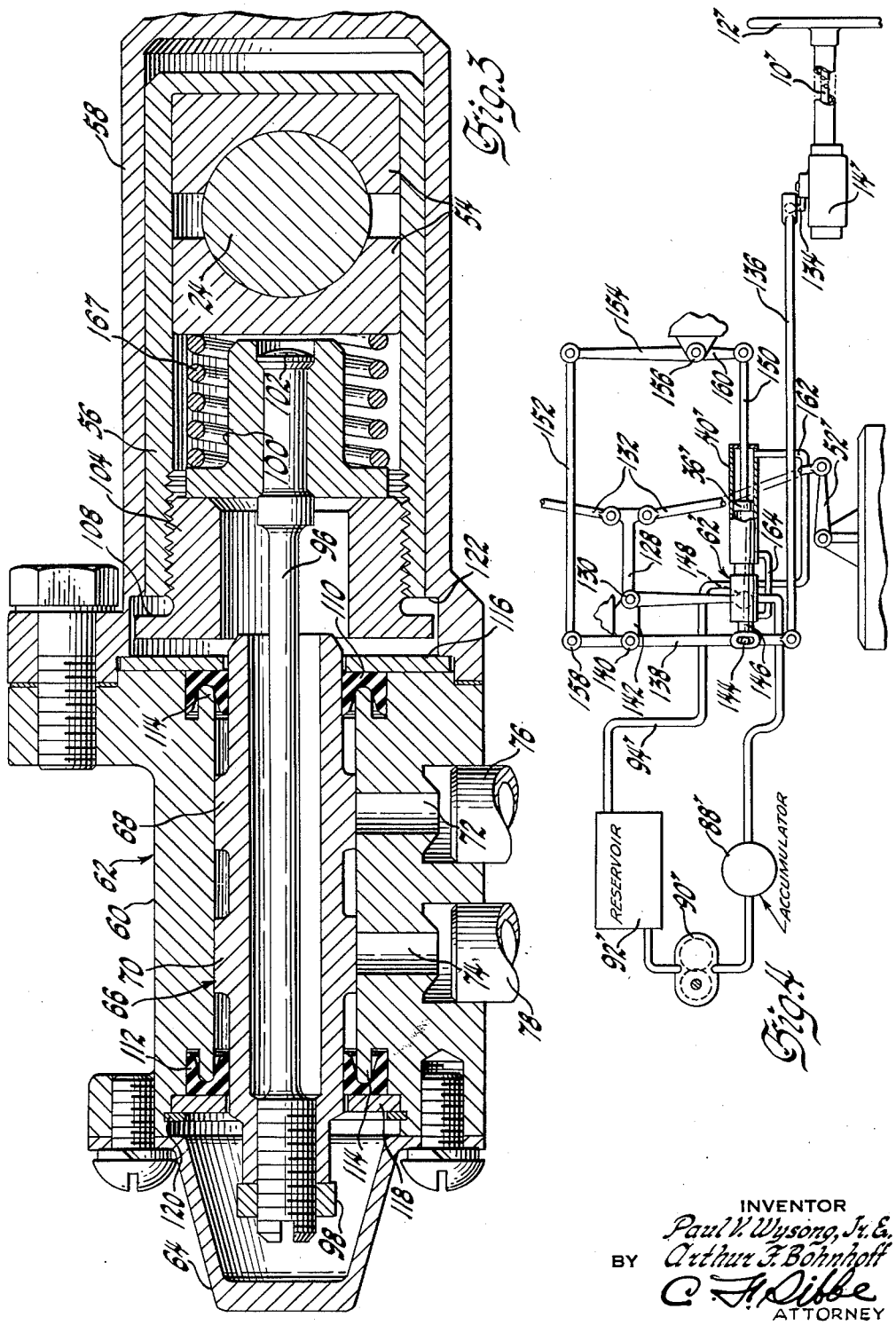
INVENTOR
Paul V. Wysong, Jr. &
BY Arthur F. Bohnhoff
C. H. Dibble
ATTORNEY

United States Patent Office 2,797,764
Patented July 2, 1957

---

2,797,764

HYDRAULIC STEERING ASSEMBLY WITH MOTOR FORMING ONE LINK OF THE ASSEMBLY

Paul V. Wysong, Jr., and Arthur F. Bohnhoff, Saginaw, Mich., assignors to General Motors Corporation, Detroit, Mich., a corporation of Delaware Application July 19, 1954, Serial No. 443,998

8 Claims. (Cl. 180—79.2)

Our invention relates to the steering of automotive vehicles and the like and more particularly concerns a system of apparatus whereby the steering function may be performed with reduced effort. In accordance therewith, there is employed a fluid-operated device which serves to balance the reaction of the dirigible wheels as necessary to enable their being turned by a predetermined quantum of manual effort applied at the steering wheel or equivalent instrumentality.

So called "power steering gears" heretofore available which involve fluid-actuated devices depend for their control on a valve which is normallyy open to a source of fluid pressure and the fluid-actuated device. This valve conventionally incorporates one or more springs tending to maintain the movable component thereof in its neutral position, corresponding to the straight-ahead position of the dirigible wheels. In the turning of the steering wheel to displace the movable valve component thereby to energize the fluid-actuated device or assistor (which must comprise a part directly or indirectly anchored to the frame of the vehicle) the resistance of the spring or springs, supplemented in some cases by fluid pressure, must necessarily be overcome. This is said to provide the operator of the vehicle with a sense of "feel."

Clearly such a synthesized "feel" is subject to a number of disadvantages. Thus, it is virtually impossible to completely eliminate what might be called a "grabbing" sensation when the power means comes into play on the displacement of the movable valve component. A further disadvantage of the synthesized "feel" goes to the fact that it unduly complicates the construction of the valve, making it a costly item both to fabricate and to assemble.

Another fault of the prior power steering gears has relation to the pump which represents the source of the pressure fluid. Conventionally, this pump is powered from the engine of the vehicle, being ordinarily belted to the crankshaft, and is in constant operation so long as the engine is running, excess fluid being by-passed to a reservoir from which the pump draws. Considering that the power demand for steering is quite light, if not virtually negligible except during parking and when the vehicle is traveling at speeds below about 30 M. P. H., much of the horsepower expended to operate the pump is not translated into useful work and therefore represents waste.

The apparatus of the present invention answers fully to objects implicit in the foregoing and is based on a concept believed completely novel in the art. Thus the valve component which is of a simple, easily fabricated construction is normally closed, while the fluid-actuated device or motor, instead of being anchored to the vehicle frame, has no such fixed connection. In view of the nature of the valve it is possible to employ an accumulator as the source of fluid pressure so that the pump needs to operate only as necessary to meet the actual power demand. With the valve closed in neutral, fluid is locked in the motor, which becomes a solid link in the system. The movable component of the valve is in its centered position not only when the dirigible wheels are in their straight ahead position, but also when these wheels are held steady in a turned position. Moreover, the apparatus is not brought to neutral condition as heretofore merely by the geometry of the steering linkage plus the spring-centering force; rather the return to neutral is also a powered operation. Perhaps most important is the fact that the road "feel" provided by the new apparatus is obtained essentially as with conventional unpowered steering gears, hence is always truly proportionate to the actual steering resistance; and there is no noticeable transition on the power means coming into play.

We shall particularly described our invention with the aid of the accompanying drawings illustrating a preferred embodiment thereof. In the drawings:

Figure 3 is a longitudinal section through the valve and the actuating means therefor; and Figure 4 is a diagrammatic representation in plan of a different form of installation.

Figure 1:
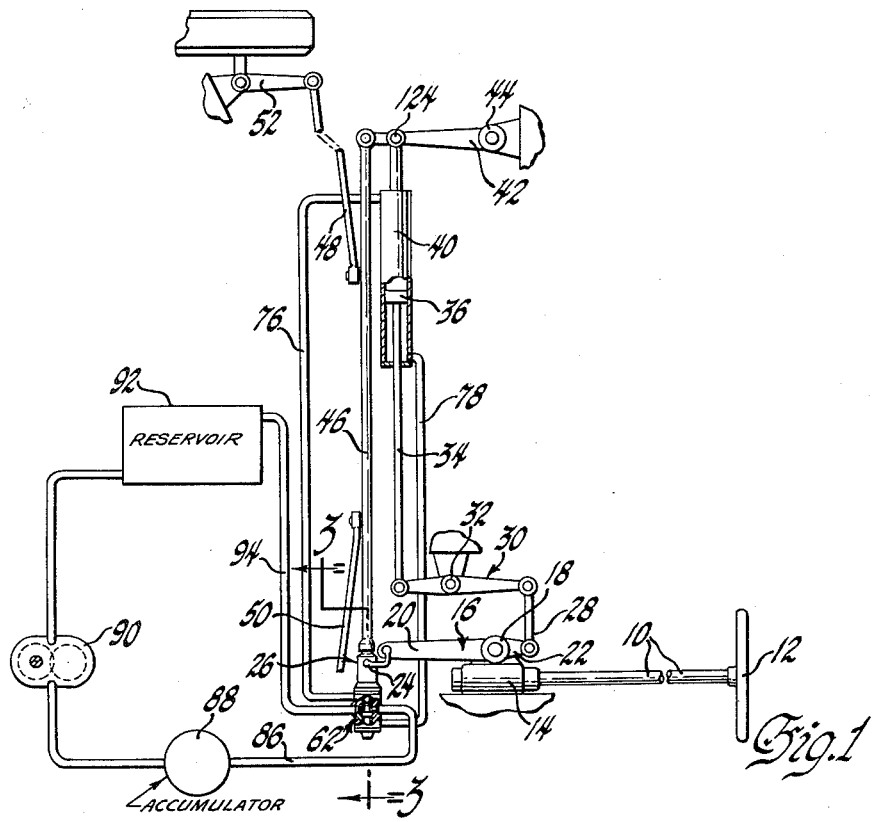
Figure 1 is a diagrammatic plan of a typical installation.

Referring first to Figure 1 the numeral 10 denotes a control or steering shaft carrying at its upper end the usual steering wheel 12. Shaft 10 terminates at its lower end in reduction gearing 14 which may be of any suitable type. A steering arm or rock shaft 16 actuated through the reduction gearing turns about a pivot 18, demarcating two lever arms 20 and 22. The longer lever arm 20 is connected via a ball stud 24 to valve actuating means, generally indicated at 26, while the short lever arm 22 is linked via a rod 28 to a second rocker arm 30 pivoted at 32.

Rocker arm 30 is connected at its end opposite the rod 28 to the shaft 34 of a piston 36 confined within a cylinder 40. This cylinder is in turn linked to an idler arm 42 pivoted at 44 and supporting one end of a drag link 46. Such link, with the tie rods 48 and 50 and steering knuckle arms 52, only one of which appears in the drawing, constitutes a typical parallelogram linkage.

Going now to Figure 3, it will be seen that the ball stud 24 carried at the free end of the longer lever arm 20 is disposed between a pair of ball seats 54 confined within a plunger 56 axially movable within predetermined limits in a sleeve 58, which is either fixedly secured to or integral with the drag link 46. Spring 167 maintains the seats 54 in proper contact with the ball stud. Sleeve 58 has bolted thereto the housing portion 60 of a control valve 62, closed at its opposite end by a cover or cap piece 64.

Housing 60 is of generally cylindrical conformation and is made hollow to accommodate a spool piece 66, which comprises a pair of annular lands 68, 70 normally maintaining the passageways 72 and 74 closed. These passageways open, respectively, to conduits 76 and 78 which extend, respectively, to the right end and left end of the cylinder 40 (Fig. 1).

Figure 2:
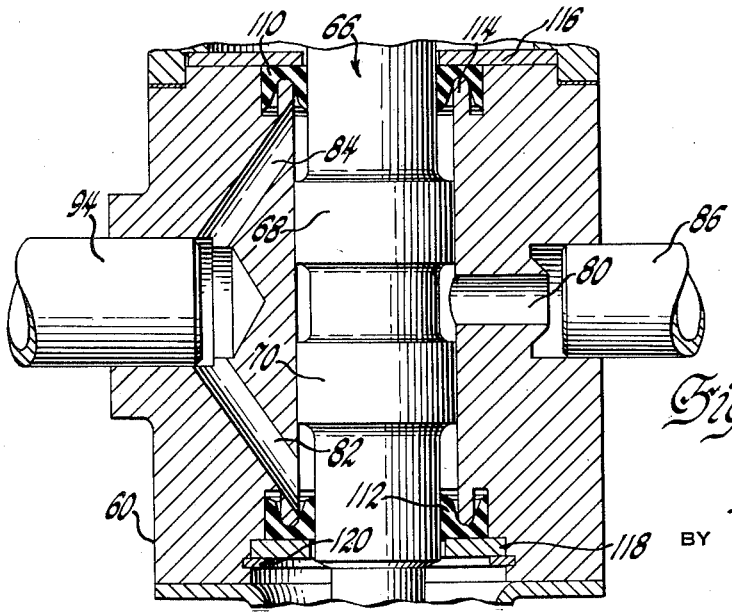
Figure 2 is a fragmentary section showing the principal parts of the valve component of the apparatus.

In addition to passageways 72 and 74, the valve housing 60 is bored and counterbored to provide passageways 80, 82 and 84 (Figure 2). Passageway 80 communicates with a conduit 86 leading from an accumulator 88 (Fig. 1), maintained under a predetermined pressure by a pump 90 drawing from a reservoir 92; while passageways 82 and 84 each communicate with a conduit 94 interconnecting the valve housing and the reservoir 92.

Reverting to the valve spool 66, there will be seen extending centrally therethrough a rod 96 (Fig. 3) which is threaded at its left hand end to accommodate a nut 98 abutting the corresponding end of the spool. Near its opposite end, stem 96 is enlarged to provide a portion shouldering into a centrally bored plug 100, secured to the stem by a riveting over. Plug 100 abuts a second and larger plug 104 threaded into the plunger 56 and having an annular flange 108.

A pair of seals 110, 112 will be seen disposed over annular rings 114 which may be made integral with the valve housing 60. Seal 110 is secured in place by a ringpiece 116 shouldered into the left hand end of the sleeve 58, while seal 112 is backed by an annular ring 118 held in place by a lock ring 120 accommodated in an annular groove formed in the valve housing.

It should be clear that spool 66, stem 96, the two plugs 100, 104, and the plunger 56 constitute one functional part longitudinally movable within the limits set by the annular shoulder 122 and the ring 116, which act as stops with respect to the flange 108.

To explain now the operation of the apparatus of Figures 1–3 let it be assumed that the operator of the vehicle wishes to negotiate a left turn. On the counterclockwise rotation of the steering wheel 12 and the shaft 10 (viewing Figure 1 from the right hand edge of the sheet) the rock arm 16 is caused to turn clockwise about its pivot 18, this action being accompanied by like turning of the second rock arm 30 about the pivot 32. Taking into consideration that the piston 36 is hydraulically locked in the cylinder 40 when the dirigible wheels and the valve spool are in center position, the link comprising the piston and cylinder initially functions as a solid link to exert a force tending to swing the idler arm 42 clockwise on its pivot. Thus the reaction or resistance of the dirigible wheels to turning is felt at the steering wheel 12 just as in the case of an ordinary manual steering gear, and this reaction is always proportionate to the actual steering resistance, a condition which is manifestly highly desirable. Assuming a resistance of any given value, the manual effort required at the steering wheel is predetermined since the mechanical advantage of the system represented by the lever arm 22, rod 28 and the second lever arm 30 is a constant.

Lever arm 20 being of greater length than lever arm 22 swings through a greater arc than the latter arm. Accordingly, the rightward movement of the ball stud 24 is greater than that of the drag link 46 as induced by the clockwise swinging movement of the idler arm 42, with the result that the valve spool 66 (Figure 3) is displaced to the right so that pressure fluid is allowed to flow from the valve into the passageway 72, thence to the right hand chamber of the cylinder 40 via the conduit 76. Such displacement of the spool also places conduit 78 in open communication with the valve porting corresponding to the return line 94 to the reservoir 92.

The pressurization of the right hand end of the cylinder 40 causes rightward movement of the cylinder relative to the piston 36 and expansion of the link comprising these parts so that the arc through which the idler arm 42 is powered is substantially greater than that through which the shorter component of the rocker arm 30 travels. The extent of the pressurization of the right hand end of the cylinder 40 is determined by the steering resistance and in any case is sufficient to balance the reaction of the dirigible wheels as necessary to allow for the turning thereof by the quantum of manual effort set by the mechanical advantage of the linkage system involving the parts mediate the pivot 18 and the connection 124. Proportionate feel continues throughout the steering operation, the thrust of the pressure fluid being exerted against the piston 36 and thence through the train of apparatus therebehind to the steering wheel 12.

On cessation of the manual effort at the steering wheel, the geometry of the steering linkage begins to function just as in the instance of an ordinary mechanical steering system to restore the dirigible wheels to their center position. The consequent movement of the drag link 46 to the left, acting through locked cylinder 40 and the train of apparatus appendant thereto, displaces the spool 66 in that direction (the spool immediately recentered on cessation of the manual effort) opening the left hand chamber of the cylinder 40 to the source of fluid pressure i. e., line 86, and placing the right hand chamber of the cylinder in communication with the exhaust line 94. The link comprising the piston and cylinder contracts on the resultant leftward movement of the cylinder relative to the piston so as to equalize the difference between the swinging arcs of the idler arm 42 and the lower component of the rocker arm 30. Return of the dirigible wheels to center is marked by simultaneous re-centering of the valve spool without "over-shooting."

It should be noted that since the valve action is controlled either from the steering wheel end of the apparatus or from the end represented by the dirigible wheels, the apparatus may be classed as a reversible position servo, which is believed entirely novel in the power steering art.

Should some component of the power equipment be damaged to such an extent that it is rendered inoperable, the vehicle can be readily steered manually through the flange 108 carried by the plug 104, the lost motion represented by the clearance between the shoulder 122 and the annulus 116 presenting no serious difficulty even to an inexperienced operator.

In the making of a right turn the action obviously will be just the opposite of that above described. In other words, the turning of the dirigible wheels will proceed with pressurization of the left hand rather than the right hand chamber of the cylinder 40 and the link comprising these parts will shorten or contract instead of expanding.

Referring now to the modified installation of Figure 4, wherein parts corresponding to parts shown in Figure 1 are correspondingly identified but with primed numerals, it will be seen that this system is fundamentally distinguished in the use of a bell crank 128 pivoted at 130. The bell crank is connected to a pair of tie rods 132 each of which is linked to a steering knuckle arm 52'; only one of which appears in the figure..

The output of the reduction gearing 14' is represented by the pitman arm or rock shaft 134 which is connected to a drag link 136. The latter directly actuates a rocker arm 138 pivoted at 140, this pivot and pivot 130 having a common fixed base 142.

Arm 138 will be noted as having a pin and slot connection 144 with a short shaft 146 through which the spool component of the valve 62' is actuated. The ball stud 148 at the valve end of the bell crank 128 should be considered as received in a socket suitably formed in the valve housing, an expedient heretofore known in the art. The operation of the valve will be readily understood from the previous description.

Rocker arm 138 is connected to the shaft 150 of the piston 36' via a pair of links 152 and 154, the latter being pivoted at 156. The housing of the valve 62' and the cylinder 40' may with advantage constitute a single assembly. In any case these two parts must be arranged to move as a unit.

Assuming a left turn with the apparatus shown in Figure 4, the counterclockwise rotation of the steering wheel 12' will bring about rearward or rightward movement of the drag link 136, with corresponding movement of the link including the hydraulically locked cylinder 40'. Due to the fact that the distance between the pivot 140 and the connection 144 is greater than the distance between such pivot and the connection 158 (also note the relative shortness of the lever arm 160) shaft 146, and with it the valve spool, is caused to travel to the right a greater distance than the cylinder link. The consequent displacement of the valve spool to the right (see Figures 2 and 3) places the right hand chamber of the cylinder in communication with the source of fluid pressure and the left hand chamber in communication with the exhaust line 94', the fluid flow being through conduits 162 and 164, respectively. The pressurization of the right hand chamber of the cylinder brings about rightward movement of the cylinder relative to the piston 36' with shortening of the link comprising these parts. As before, the extent of the pressurization is such as to balance the reaction of the dirigible wheels as necessary to allow for the turn being accomplished through the application at the steering wheel 12' of a predetermined quantum of manual effort set by the mechanical advantage of the linkage system.

In the negotiation of a right turn, it should be obvious that the left hand chamber of the cylinder 40' will be pressurized so as to power the bell crank 128 clockwise, this action being marked by expansion rather than contraction of the link including the cylinder. And it should be equally clear, particularly in light of the prior description, that irrespective of the direction of turn, the counter-rotation of the bell crank on cessation of the manual turning effort at the steering wheel, initiated by the geometry of the steering linkage, will be marked by pressurization of the chamber in the power cylinder which was open to exhaust during the turning cycle.

It should be emphasized that in the case of either of the embodiments of the invention herein disclosed the initial movement of the dirigible wheels is accomplished mechanically through the high ratio mechanism composed of the reduction gear and the linkage system between the steering shaft and the piston component of the fluid motor. Such ratio is equal to the ratio of the reduction gear multiplied by the ratio of the linkage system. Thus, in the instance of the embodiment of Figure 1 it can be readily seen that during the interval of the initial movement, the drag link 46 moves slower than the pitman ball 24. Accordingly, the operator has a vernier adjustment available to make minor corrections in the position of the dirigible wheels at any time that the valve is in a neutral position. As soon as the linkage has moved enough to displace the valve from its neutral position, oil admitted to the cylinder 40 will then cause the drag link 46 to follow the pitman arm ball 24. This ball is moving at a rate determined by the ratio of the reduction gear 14 and the arm 20. Consequently the drag link experiences a speed change at the instant the valve is opened, although the operator is moving the steering wheel 12 at a constant rate. Since the thrust acting through the cylinder 40 does not change at the instant of valving, the load at the steering wheel 12 remains constant. Because of this, the operator is unaware of any change in the steering system ratio.

Similar effects are had in the case of the embodiment of Figure 4. Here again during the interval of the initial movement the steering is accomplished via the hydraulically locked motor and the auxiliary linkage system (levers 138, 152 and 154). This follows because ports 72 and 74 of the control valve are substantially overlapped by the lands of the valve spool (Fig. 3), a condition permitting the desired movement of the auxiliary linkage without energization of the motor. When the lever 138 has moved enough to displace the spool beyond the valving edge of the land, pressure fluid is admitted to the motor to power the bell crank in the proper direction. As above, the operator is unaware of any change in the steering system ratio occasioned by the motor coming into play.

Having thus described and illustrated our invention what we claim is:

1. Steering apparatus comprising a source of fluid pressure, a manually actuable steering member, a steered member, a linkage between said members, a fluid motor supplied from said source and including a pair of relatively movable parts one of which is connected to a component of said linkage, a closed-center control valve for said motor displaceable on actuation of said steering member, and a force multiplying lever system interconnecting said steering member and the other of said parts of said motor, said apparatus being characterized in operation in that during the initial stage of the steering action the steering is effected through said lever system and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering member.

2. Steering apparatus comprising a source of fluid pressure, a manually actuable steering member, a steered member, a linkage between said members, a fluid motor including a cylinder component supplied from said source and a piston component reciprocal within said cylinder, one of said motor components being connected to a component of said linkage, a closed-center control valve for said motor displaceable on actuation of said steering member, and a force multiplying lever system interconnecting said steering member and the other of said motor components, said apparatus being characterized in operation in that during the initial stage of the steering action the steering is effected through said lever system and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering member.

3. Steering apparatus comprising a source of fluid pressure, a manually actuable steering member, a steered member, a linkage between said members, a fluid motor including a cylinder connected to a component of said linkage and a piston reciprocal within said cylinder, said cylinder being supplied with pressure fluid from said source, a closed-center control valve connected to said steering member through reduction gearing and displaceable on actuation of said steering member, and a force multiplying lever system interconnecting said steering member and said piston, said apparatus being characterized in operation in that during the initial stage of the steering action the steering is effected through said lever system and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering member.

4. Steering apparatus comprising a source of fluid pressure, a manually actuable steering member, a steered member, a linkage between said members, a fluid motor including a cylinder connected to a component of said linkage and a piston reciprocal within said cylinder, said cylinder being supplied with pressure fluid from said source, a closed-center control valve connected to said steering member through reduction gearing and a lever element, and force multiplying lever means interconnecting said lever element and said piston, the connections between said element and said means and between said element and said valve being made at opposite sides of the fulcrum point of said element, said apparatus being characterized in operation in that during the initial stage of the steering action the steering is effected through said lever system and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering member.

5. Steering apparatus comprising a source of fluid pressure, a manually actuable steering shaft, a steered member, a parallelogram linkage including an idler arm and a cross tie rod between said shaft and said member, a fluid motor including a cylinder connected to said idler arm and a piston reciprocal within said cylinder, said cylinder being supplied with pressure fluid from said source, a closed-center control valve carried by said cross tie rod and connected to said steering shaft through reduction gearing and a lever element, and force multiplying lever means interconnecting said lever element and said piston, the connections between said element and said means and between said element and said valve being made at opposite sides of the fulcrum point of said element, said apparatus being characterized in operation in that during the initial stage of the steering action the steering is effected through said lever means and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering shaft.

6. Steering apparatus comprising a source of fluid pressure, a manually actuable steering shaft, a steered member, a linkage including a bell crank between said shaft and said member, a fluid motor including a cylinder connected to said bell crank and a piston reciprocal within said cylinder, said cylinder being supplied with pressure fluid from said source, a closed-center control valve integrated with said cylinder and connected to said steering shaft through reduction gearing and through a reach rod and a lever element, and force multiplying lever means interconnecting said lever element and said piston, the connections between said element and said means and between said element and said valve being made at opposite sides of the fulcrum point of said element, said apparatus being characterized in operation in that during the initial stage of the steering action the steering is effected through said lever means and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering shaft.

7. Steering apparatus comprising a source of fluid pressure, a manually actuable steering member, a steered member, a linkage between said members, a fluid motor supplied from said source and including a pair of relatively movable parts one of which is connected to a component of said linkage, closed-center control valve connected to said steering member through reduction gearing and displaceable on actuation of said steering member, and a force multiplying lever system interconnecting said steering member and the other of said parts of said motor, said apparatus being characterized in operation in that during the initial stage of the steering action the steering is effected through said lever system and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering member.

8. Steering apparatus comprising a source of fluid pressure, a manually actuable steering member, a steered member, a linkage between said members, a fluid motor supplied from said source and including a pair of relatively movable parts one of which is connected to a component of said linkage, a closed-center control valve connected to said steering member through reduction gearing and a lever element, and force multiplying lever means interconnecting said lever element and the other of said parts of said motor, the connections between said element and said means and between said element and said valve being made at opposite sides of the fulcrum point of said element, said apparatus being characterized in operation in that during the initial stage of the steering action the steering is effected through said lever system and said motor which then acts as a solid member and in that following said initial stage said valve is displaced to energize said motor which expands or contracts depending upon the direction of turn to balance the reaction of the load as necessary to allow for the steering being accomplished by a predetermined quantum of manual effort applied at said steering member.

References Cited in the file of this patent

UNITED STATES PATENTS

| | | |
|---|---|---|
| 2,020,041 | Rockcastle et al. | Nov. 5, 1935 |
| 2,369,324 | Thompson | Feb. 13, 1945 |
| 2,427,340 | Allison | Sept. 16, 1947 |
| 2,429,185 | Hukill | Oct. 14, 1947 |
| 2,447,815 | Price | Aug. 24, 1948 |
| 2,676,663 | Smith | Apr. 27, 1954 |

FOREIGN PATENTS

| | | |
|---|---|---|
| 1,084,124 | France | Jan. 17, 1955 |

(Corresponding U. S. 2,732,904, Jan. 31, 1956)